United States Patent
Koripella et al.

(10) Patent No.: US 7,776,386 B2
(45) Date of Patent: Aug. 17, 2010

(54) METHOD FOR FORMING A MICRO FUEL CELL

(75) Inventors: Chowdary R. Koripella, Scottsdale, AZ (US); Kurt W. Eisenbeiser, Tempe, AZ (US); Ramkumar Krishnan, Gilbert, AZ (US)

(73) Assignee: Motorola, Inc., Schaumburg, IL (US)

( * ) Notice: Subject to any disclaimer, the term of this patent is extended or adjusted under 35 U.S.C. 154(b) by 851 days.

(21) Appl. No.: 11/669,712

(22) Filed: Jan. 31, 2007

(65) Prior Publication Data
US 2008/0178461 A1 Jul. 31, 2008

(51) Int. Cl.
*H01M 4/88* (2006.01)
*H01M 8/02* (2006.01)
*H01M 8/10* (2006.01)

(52) U.S. Cl. .................................................. 427/115
(58) Field of Classification Search ................. 427/115; 429/30, 32
See application file for complete search history.

(56) References Cited

U.S. PATENT DOCUMENTS

| | | | |
|---|---|---|---|
| 6,312,846 B1 | 11/2001 | Marsh | |
| 6,541,149 B1 | 4/2003 | Maynard et al. | |
| 6,872,287 B1 | 3/2005 | McLean | |
| 2002/0177025 A1* | 11/2002 | Kushibiki et al. | 429/30 |
| 2003/0003347 A1 | 1/2003 | D'Arrigo et al. | |
| 2004/0058226 A1 | 3/2004 | Lamarre et al. | |
| 2004/0185323 A1 | 9/2004 | Fowler et al. | |
| 2005/0060876 A1 | 3/2005 | Marsh | |
| 2005/0130021 A1 | 6/2005 | Marsh | |
| 2005/0142410 A1 | 6/2005 | Higashi | |
| 2005/0167014 A1 | 8/2005 | Yamauchi et al. | |
| 2005/0255368 A1 | 11/2005 | Kaye et al. | |

FOREIGN PATENT DOCUMENTS

| | | |
|---|---|---|
| WO | 03/038935 | 5/2003 |
| WO | 2005079466 A2 | 9/2005 |
| WO | 2006112583 A1 | 10/2006 |
| WO | 2007100947 A2 | 9/2007 |
| WO | 2008033606 A1 | 3/2008 |

OTHER PUBLICATIONS

International Search Report PCT/US2007/088937 dated Apr. 24, 2008.

* cited by examiner

*Primary Examiner*—Gregg Cantelmo
(74) *Attorney, Agent, or Firm*—Ingrassia, Fisher & Lorenz, P.C.

(57) ABSTRACT

A method is provided for fabricating an integrated micro fuel cell that derives power from a three-dimensional fuel/oxidant interchange having increased surface area and that is positioned on a second substrate that may be either porous or flexible with gas access holes, thereby avoiding precise alignment requirements of the openings providing fuel thereto. The method comprises forming on a first substrate, a plurality of pedestals including an anode and a cathode each comprising a porous metal; positioning an electrolyte between the anode and the cathode; and forming first metal contacts on the anode and cathode. The first substrate is removed and a second substrate is positioned against the fuel cell wherein the first metal contacts are selectively positioned to make electrical contact with second metal contacts on the second substrate.

21 Claims, 4 Drawing Sheets

METHOD FOR FORMING A MICRO FUEL CELL

RELATED APPLICATIONS

This application relates to U.S. Patent Publication Number 2007/0202378, Integrated Micro Fuel Cell Apparatus, filed 28 Feb. 2006, U.S. Patent Publication Number 2008/003485, Fuel Cell Having Patterned Solid Proton Conducting Electrolytes, filed 30 Jun. 2006, U.S. Patent Publication Number 2008/0061027, Method for Forming a Micro Fuel Cell, filed 12 Sep. 2006, and now abandoned, and U.S. Patent Publication Number 2008/0118815, Method for Forming a Micro Fuel Cell, filed 20 Nov. 2006.

FIELD OF THE INVENTION

The present invention generally relates to fuel cells and more particularly to a method of readily providing fuel and oxidant to a micro fuel cell having a flexible substrate.

BACKGROUND OF THE INVENTION

Rechargeable batteries are currently the primary power source for cell phones and various other portable electronic devices. The energy stored in the batteries is limited. It is determined by the energy density (Wh/L) of the storage material, its chemistry, and the volume of the battery. For example, for a typical Li ion cell phone battery with a 250 Wh/L energy density, a 10 cc battery would store 2.5 Wh of energy. Depending upon the usage, the energy could last for a few hours to a few days. Recharging always requires access to an electrical outlet. The limited amount of stored energy and the frequent recharging are major inconveniences associated with batteries. Accordingly, there is a need for a longer lasting, easily recharging solution for cell phone power sources. One approach to fulfill this need is to have a hybrid power source with a rechargeable battery and a method to trickle charge the battery or develop miniature power sources to directly power the cell phone or other electronic devices. Important considerations for an energy conversion device for this application include power density, energy density, size, and the efficiency of energy conversion.

Energy harvesting methods such as solar cells, thermoelectric generators using ambient temperature fluctuations, and piezoelectric generators using natural vibrations are very attractive power sources to trickle charge a battery. However, the energy generated by these methods is small, usually only a few milliwatts. In the regime of interest, namely, a few hundred milliwatts, this dictates that a large volume is required to generate sufficient power, making it unattractive for cell phone type applications.

An alternative approach is to carry a high energy density fuel and convert this fuel energy with high efficiency into electrical energy to recharge the battery or directly power the cell phone or other electronic device. Radioactive isotope fuels with high energy density are also being investigated for portable power sources. However, with this approach the power densities are low and there are safety concerns associated with the radioactive materials. This is an attractive power source for remote sensor-type applications, but not for cell phone power sources. Among the various other energy conversion technologies, the most attractive one is fuel cell technology because of its high efficiency of energy conversion and the demonstrated feasibility to miniaturize with high efficiency.

Fuel cells with active control systems and those capable of operating at high temperatures are complex systems and are very difficult to miniaturize to the 2-5 cc volume needed for cell phone application. Examples of these include active control direct methanol or formic acid fuel cells (DMFC or DFAFC), reformed hydrogen fuel cells (RHFC), and solid oxide fuel cells (SOFC). Passive air-breathing hydrogen fuel cells, passive DMFC or DFAFC, and biofuel cells are attractive systems for this application. However, in addition to the miniaturization issues, other concerns include supply of hydrogen for hydrogen fuel cells, lifetime and energy density for passive DMFC and DFAFC, and lifetime, energy density and power density with biofuel cells.

Conventional hydrogen fuel cells, DMFC and DFAFC designs comprise planar, stacked layers for each cell. Individual cells may then be stacked for higher power, redundancy, and reliability. The layers typically comprise graphite, carbon or carbon composites, polymeric materials, metal such as titanium and stainless steel, and ceramic. The functional area of the stacked layers is restricted, usually on the perimeter, by vias for bolting the structure together and accommodating the passage of fuel and an oxidant along and between cells. Additionally, the planar, stacked cells derive power only from a fuel/oxidant interchange in a cross-sectional area (x and y coordinates).

To design a fuel cell/battery hybrid power source in the same volume as a typical mobile device battery (10 cc-2.5 Wh), both a smaller battery and a fuel cell with high power density and efficiency would be required to achieve an overall energy density higher than that of the battery alone. For example, for a 4-5 cc (1.0-1.25 Wh) battery to meet the peak demands of the phone, the fuel cell would need to fit in 1-2 cc, with the fuel taking up the rest of the volume. The power output of the fuel cell needs to be 0.5 W or higher to be able to recharge the battery in a reasonable time. Most development activities on small fuel cells are attempts to miniaturize traditional fuel cell designs, and the resultant systems are still too big for mobile applications. A few micro fuel cell development activities have been disclosed using traditional silicon processing methods in planar fuel cell configurations, and in a few cases, porous silicon is employed to increase the surface area and power densities. See, for example, U.S. Patent/Publication Numbers 2004/0185323, 2004/0058226, U.S. Pat. No. 6,541,149, and 2003/0003347. However, the power densities of the air-breathing planar hydrogen fuel cells are typically in the range of 50-100 mW/cm$^2$. To produce 500 mW would require 5 cm$^2$ or more active area. Further, the operating voltage of a single fuel cell is in the range of 0.5-0.7V. At least four to five cells need to be connected in series to bring the fuel cell operating voltage to 2-3V and for efficient DC-DC conversion to 4V in order to charge the Li ion battery. Therefore, the traditional planar fuel cell approach will not be able to meet the requirements in a 1-2 cc volume for a fuel cell in the fuel cell/battery hybrid power source for cell phone use.

Microfabricated fuel cells, however, still have the fundamental components of large scale fuel cells, or components which perform similar functions. Among these are gas diffusion layers, catalyst supports, and electrocatalysts. Typically, a supply of hydrogen is provided by etching holes through the backside of rigid substrate. With a stacked structure as described in U.S. Pat. No. 6,541,149 and U.S. patent publications 2004/0185323, 2004/0058226, and 2003/0003347, alignment of the holes is not critical as all the holes reach to the anode. However, for any 3-D fuel cell with anodes and cathodes arranged in the same plane of the substrate, creation of the individual hydrogen access holes under each anode and alignment of the holes is critical. The presence of a large number of holes through the substrate tend to make the substrate fragile. The stresses generated by the thermal expansion and contraction of the electrolyte during the fuel cell operation can create cracks in the substrate causing serious reliability concerns. Furthermore, fabrication processes for these high aspect ratio holes through the rigid substrate and alignment under the anodes is expensive. Therefore a method and structure is needed that overcomes these issues.

Accordingly, it is desirable to provide an integrated micro fuel cell that derives power from a three-dimensional fuel/oxidant interchange having increased surface area and is provided on a substrate that is either flexible and/or porous, thereby avoiding precise alignment requirements of the holes providing fuel thereto. Furthermore, other desirable features and characteristics of the present invention will become apparent from the subsequent detailed description of the invention and the appended claims, taken in conjunction with the accompanying drawings and this background of the invention.

BRIEF SUMMARY OF THE INVENTION

A method is provided for fabricating a plurality of integrated micro fuel cells on a flexible substrate that derive power from a three-dimensional fuel/oxidant interchange having increased surface area, ease of manufacturing, high reliability and design of conformal power sources depending on the application. The method comprises forming a plurality of micro fuel cells on a rigid donor substrate and forming a flexible host substrate having electrical interconnects. The micro fuel cells are removed from the rigid substrate and bonded on the flexible substrate wherein the electrical interconnects contact an anode and cathode of each of the micro fuel cells.

BRIEF DESCRIPTION OF THE DRAWINGS

The present invention will hereinafter be described in conjunction with the following drawing figures, wherein like numerals denote like elements.

DETAILED DESCRIPTION OF THE INVENTION

Figure 1:
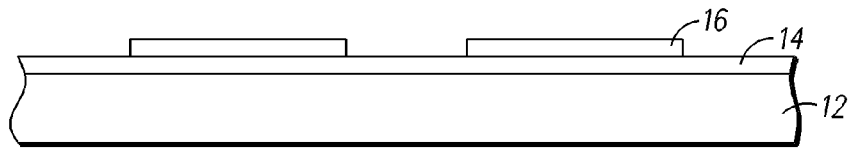
FIGS. 1-2, 4-7, and 9-15 are partial cross-sectional views of two fuel cells as fabricated in accordance with a first exemplary embodiment.

The following detailed description of the invention is merely exemplary in nature and is not intended to limit the invention or the application and uses of the invention. Furthermore, there is no intention to be bound by any theory presented in the preceding background of the invention or the following detailed description of the invention.

The main components of a micro fuel cell device are a proton conducting electrolyte separating the reactant gases of the anode and cathode regions, an electrocatalyst which helps in the oxidation and reduction of the gas species at the anode and cathode of the fuel cell, a gas diffusion region to provide uniform reactant gas access to the anode and cathode, and a current collector for efficient collection and transportation of electrons to a load connected across the fuel cell. Optional components include an ionomer intermixed with electrocatalyst and/or a conducting support for electrocatalyst particles that help in improving performance. In the fabrication of the micro fuel cell structures, the design, structure, and processing of the electrolyte and electrocatalyst are critical to achieve high energy and power densities, with improved lifetime and reliability.

Fabrication of individual micro fuel cells comprises forming high aspect ratio three dimensional anodes and cathodes with sub-100 micron dimensions to provide a high surface area for the electrochemical reaction between a fuel (anode) and an oxidant (cathode). At these small dimensions, precise alignment of the anode, cathode, electrolyte and current collectors was previously required to prevent shorting of the cells. This alignment was accomplished by semiconductor processing methods used in integrated circuit processing.

The fabrication of integrated circuits, microelectronic devices, micro electro mechanical devices, microfluidic devices, and photonic devices, involves the creation of several layers of materials that interact in some fashion. One or more of these layers may be patterned so various regions of the layer have different electrical or other characteristics, which may be interconnected within the layer or to other layers to create electrical components and circuits. These regions may be created by selectively introducing or removing various materials. The patterns that define such regions are often created by lithographic processes. For example, a layer of photoresist material is applied onto a layer overlying a wafer substrate. A photomask (containing clear and opaque areas) is used to selectively expose this photoresist material by a form of radiation, such as ultraviolet light, electrons, or x-rays. Either the photoresist material exposed to the radiation, or that not exposed to the radiation, is removed by the application of a developer. An etch may then be applied to the layer not protected by the remaining resist, and when the resist is removed, the layer overlying the substrate is patterned. Alternatively, an additive process could also be used, e.g., building a structure using the photoresist as a template.

Parallel micro fuel cells in three dimensions fabricated using optical lithography processes typically used in semiconductor integrated circuit processing just described produce fuel cells with the required power density in a small volume. The cells may be connected in parallel or in series to provide the required output voltage. Functional micro fuel cells are fabricated in micro arrays (formed as pedestals) in the substrate. The anode/cathode ion exchange occurs in three dimensions with the anode and cathode areas separated by an insulator. Gasses comprising an oxidant, e.g., ambient air, and a fuel, e.g., hydrogen, may be supplied on opposed sides of the substrate. A process is described herein to improve the surface area of the micro fuel cell, resulting in enhanced electrochemical contact area, a miniaturized high aspect ratio three-dimensional fuel cell, and a simplified integration and processing scheme for providing the fuel cell on a second substrate that avoids precise alignment and processing requirements of previously known processes. The three-dimensional fuel cell is integrated as a plurality of micro fuel cells using templated processes, for example, on a rigid donor substrate, including cell interconnect layers and high aspect ratio porous metal anode/cathode structures built on a patterned metal plane. The fuel cell is placed onto a host substrate, preferably one of a flexible substrate or a porous substrate, having gas access channels pre-formed therein. A "smart cutting" process, oxide layer polishing, or selective etch process separates the fuel cell from the rigid substrate. This method allows creating conformable high performance micro fuel cell power sources to suit the application. Creating thin porous areas on the flex substrate under the micro fuel cell arrays, precise alignment of the anodes to the gas feed holes on the flex substrate is not required, making it much easier for manufacturability, and easier to package with a fuel delivery scheme with a single gas inlet. Cell interconnects are also made in the flex substrate making it much easier to integrate with the intended application.

Figure 2:
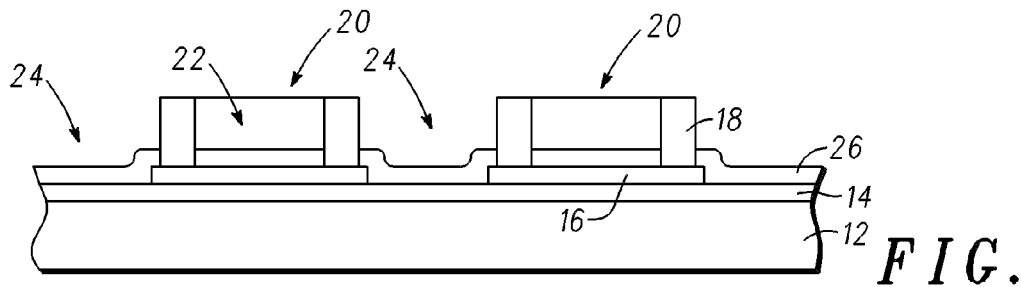
Figure 3:
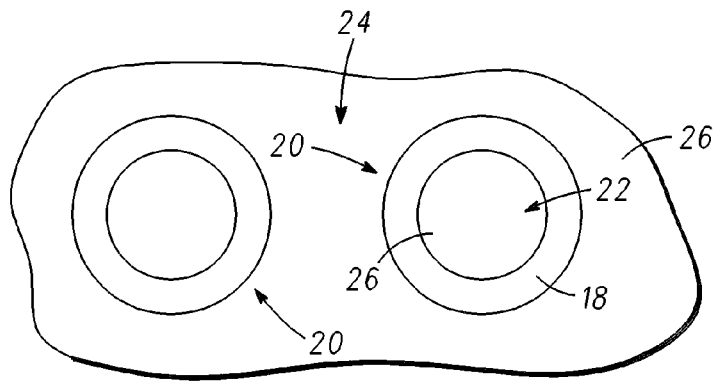
FIG. 3 is a partial cross-sectional top view taken along the line 3-3 of FIG. 2.

Two exemplary embodiments described herein illustrate exemplary processes wherein a plurality of micro fuel cells are fabricated on a rigid donor substrate and transferred to a second substrate. Referring to FIG. 1, a thin layer 14 of insulating film, preferably a TEOS oxide or Tetraethyl Orthosilicate $(OC_2H_5)_4$, is deposited on a rigid substrate 12 to provide insulation for subsequent metallization layers which may be an electrical back plane (for I/O connections, current traces, etc.). The substrate serves as a donor substrate and may comprise, for example, silicon. Another insulating layer 16, preferably comprising the same material as the thin layer 14, is patterned, e.g., as islands, on the thin layer 14. The thickness of the thin layer 14 may be in the range of 0.1 to 1.0 micrometers, but preferably would be 0.5 micrometers. A photoresist 18 is formed and patterned (FIGS. 2 and 3) in circular pillars 20 on the insulating layer 16 to a height in the range of 5.0 to 100.0 micrometers, for example, but preferably 10.0 micrometers, and a thickness from the outer to inner circumference of about 5.0 micrometers. Each circular pillar 20 defines a cavity 22 within the inner concentric circumference and a cavity 24 surrounding the circular pillars 20. Concentric as used herein means having a structure having a common center, but the anode, cavity, and cathode walls may take any form and are not to be limited to circles. For example, the pedestals 20 may alternatively be formed by etching orthogonal trenches. A metal layer 26 is deposited on the thin layer 14 and the insulating layer 16 not covered by the photoresist 18 to act as a seed layer for subsequent processes described hereinafter. The metal layer 26 may have a thickness in the range of 0.05-2.0 micrometer, but preferably is 0.1 micrometer. Metals for the metal layer 26 may include, for example, platinum, silver, palladium, ruthenium, and nickel, but preferably comprises gold.

Porous Anodes/cathodes over the metal layer 26 can be formed by chemical or electrochemical methods, for example chemical/electrochemical dealloying of metal alloys (Ag—Au, Ni—Cu etc) or template assisted growth using assembled polymer/inorganic beads as molds. Two exemplary methods of forming porous anodes/cathodes are described below.

Figure 4:
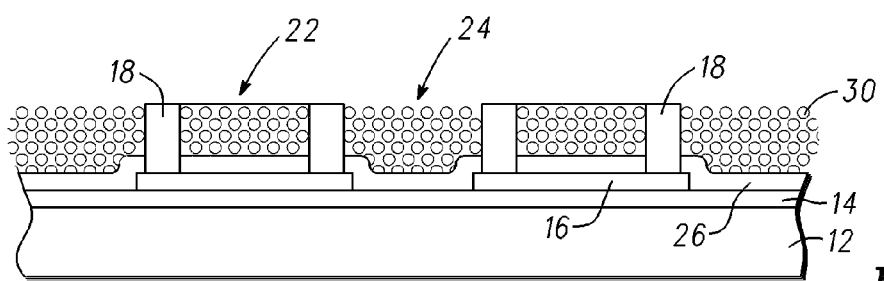

Porous anodes/cathodes can also be formed by using polymer or inorganic beads as a template. Referring to FIG. 4, a plurality of beads 30 are dispensed, by suspension for example, in the cavities 22 and 24. The solvent, for example, water, can be removed by drying in air or under controlled conditions of humidity and temperature, or ambient conditions, allowing the beads 30 to settle in the cavities 22 and 24. Beads 30 can be filled below, above, or equal to the height of the photoresist 18 by changing the amount of beads dispensed, preferably, to the height of the photoresist 18. The beads 30 are generally spherical in shape, and though they each typically contact adjacent beads, space exists between the beads 30. The beads 30 preferably comprise latex/polystyrene, but may also comprise silica, polymethyl methacrylate (PMMA), for example. Beads may also be functionalized with organic groups such as carboxylate or amine to improve/change adhesion and assembly into the cavities. Bead size can range from 20 nanometers to the width of the cavities 22, but preferably are between 200 nanometers and 10 micrometers and are readily available commercially from a number of companies including VWR, Polysciences, and SPI supplies. After assembly of the beads 30 in cavities 22 and 24, a thermal anneal treatment may be optionally performed to improve the contact between adjacent beads.

Figure 5:
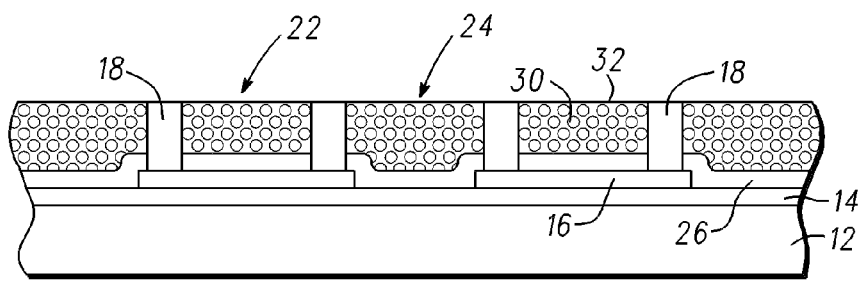
Figure 6:
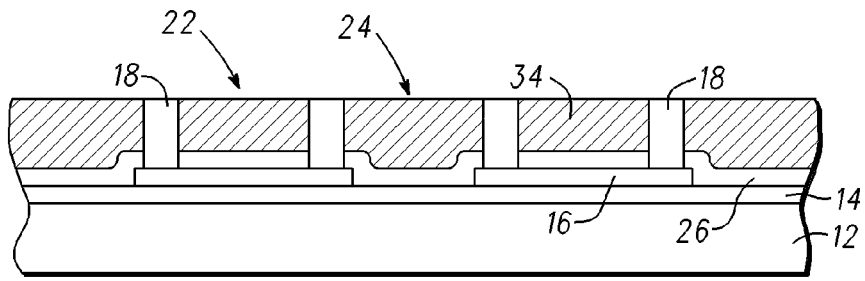

A metal 32 (FIG. 5) is placed, by chemical or electrochemical deposition for example, in the cavities 22 and 24 not occupied by the beads 30 (in the space between and around the beads 30). The metal 32 is preferably gold or platinum, but may comprise any metal having an electrochemical standard reduction potential between minus 1.6 and a plus 0.8 volts, and more particularly between a minus 1.0 and a plus 0.34 volts, as the values are generally defined in the industry, for example, at least one of the metals gold, platinum, palladium, nickel, copper, iron, zinc, chromium, cobalt, magnesium, technetium, rhodium, indium, tin, antimony, tellurium, selenium, rhenium, osmium, iridium, mercury, cadmium, lead, and bismuth. After forming the metal 32, the photo resist pillars 18 are removed using a suitable solvent or acid material. The beads 30 are then removed by chemical etching in a solvent or acid at room temperature or by calcination in air or a combination of both, thereby leaving a porous metal 34 in each of the cavities 22 and 24 (FIG. 6). The porous metal 34 created by this method defines cavities, or open areas, with pore size ranging from 10 nm to microns depending on the size of the beads used in this template process. It should be understood that any templated process for creating a fuel cell may be used with the present invention. It should be understood that the fuel cell may also be formed by depositing an alloy into the templated structure and dealloying it to make it porous as described in U.S. patent applications listed in paragraph [0001]. The template such as beads 30 act as a sacrificial material and is removed after formation of metal 32. The porous metal 34 created by this method defines cavities, or open areas, on a macroscale as defined by the International Union of Pure Applied Chemists (IUPAC). The IUPAC defines macroporous as comprising openings greater than 50.0 nanometers, microporous as comprising openings less than 2.0 nanometers, and mesoporous as comprising openings between 2.0 and 50.0 nanometers. The size of the beads used in this template process controls the pore size. It should be understood that any templated process for creating a fuel cell may be used with the present invention, whether classified as macroporous, microporous, or mesoporous.

Figure 7:
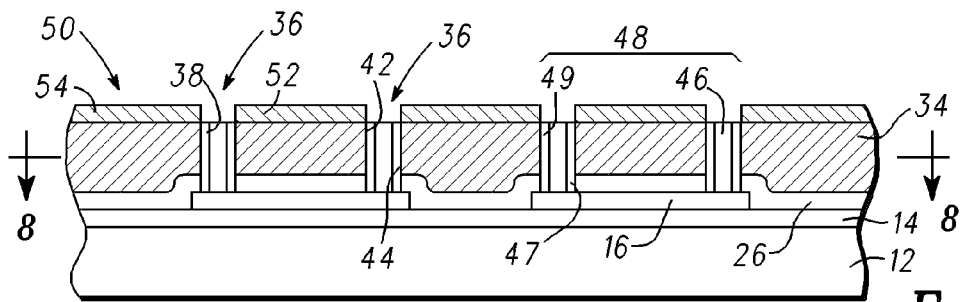
Figure 8:
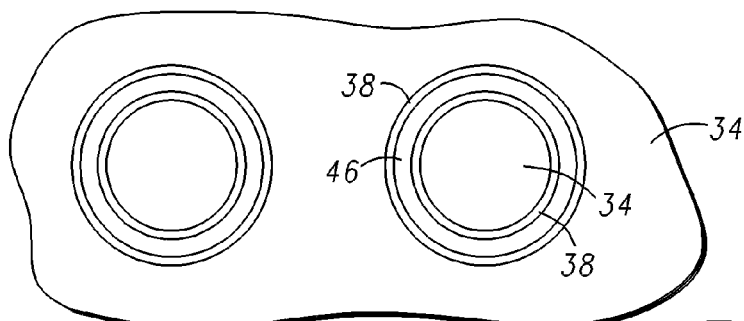
FIG. 8 is a partial cross-sectional top view taken along the line 15-15 of FIG. 14.

Referring to FIGS. 7 and 8 (FIG. 8 is taken along the line 8-8 of FIG. 7), in the circular channels 36 created after removing the photo resist 18, an electrocatalyst 38 is formed on the sides of the porous metal 34, within and on both sides 42 and 44 of the circular channels 36. The electrocatalyst 38 improves anode and cathodic fuel cell reactions and is applied by wash coat or some other deposition methods such as CVD, PVD or electrochemical methods. The pores of the porous metal 34 may also be coated with the electrocatalyst 38 there by creating more surface area for the catalytic activity at the anodes and the cathodes of the fuel cell for improved cell performance. An electrolyte 46 is formed within the circular channels 36 (FIG. 9), resulting in a pedestal 48 comprising a center anode 47 (inner section) and a concentric cathode 49 (outer section) surrounding and separated by the electrolyte 46 from the anode 47. The pedestal 48 preferably has a diameter of 10 to 100 microns. The distance between each pedestal 48 would be 10 to 100 microns, for example. The electrolyte material 46 may comprise, for example, perflurosulphonic acid (Nafion®), phosphoric acid, or an ionic liquid electrolyte. Perflurosulphonic acid has a very good ionic conductivity (0.1 S/cm) at room temperature when humidified. The electrolyte material also can be a proton conducting ionic liquids such as a mixture of bistrifluromethane sulfonyl and imidazole, ethylammoniumnitrate, methyammoniumnitrate of dimethylammoniumnitrate, a mixture of ethylammoniumnitrate and imidazole, a mixture of elthylammoniumhydrogensulphate and imidazole, flurosulphonic acid and trifluromethane sulphonic acid. Metal interconnects 52 and 54 are then formed by deposition of Titanium/gold with a thickness of 1.0 to 10.0 micrometers, for example, on the porous metal 34 using standard lithographic techniques. The metal interconnects 52 and 54 are formed with a chemical mechanical polish, and further similar processing in a manner known to those skilled in the art results in contact with the porous metal 34. It should be noted that a lift off based process may also be used to form the metal interconnects 52 and 54.

Figure 10:
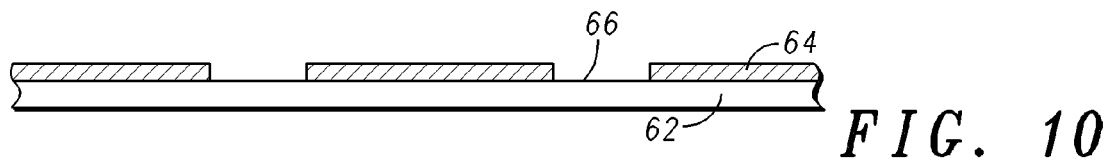
Figure 11:
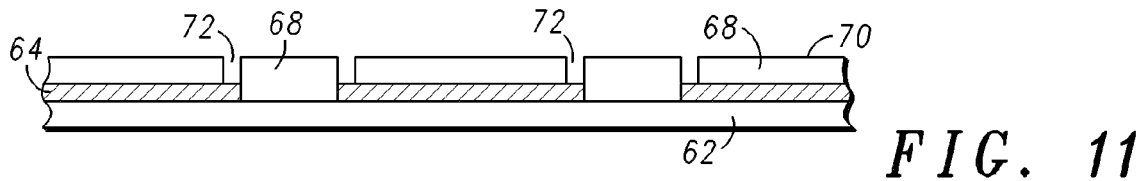
Figure 12:
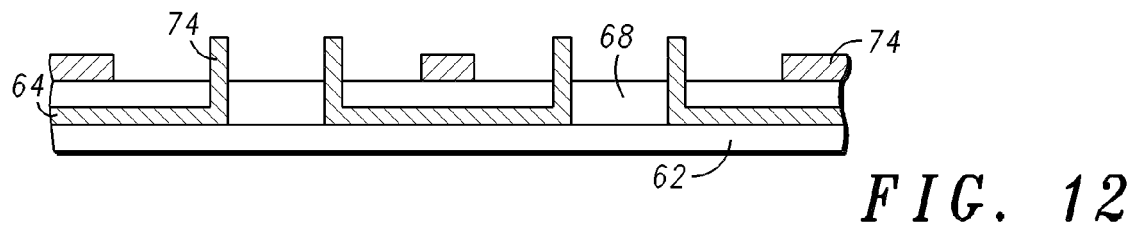
Figure 13:
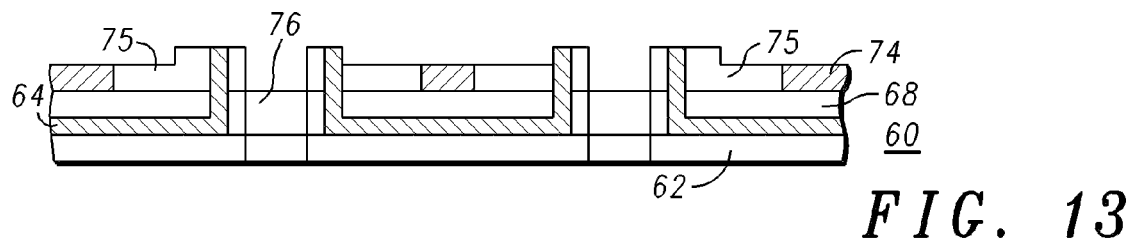

Referring to FIG. 10 and in accordance with the first exemplary embodiment, a cross section of a flexible substrate (60) is provided that serves as a host substrate and preferably comprises a polymer material 62, but may comprise any material that is flexible. A conductive metal 64, for example copper, is formed on a side 66 of the polymer material 62. Additional polymer material 68 is formed and patterned (FIG. 11) on the conductive metal 64 and the side 66 to provide a surface 70 and vias 72. Another conductive metal, 74 is formed on the surface 70 and within the vias 72 (FIG. 12). The conductive metals 64 and 74 may be formed, for example, by ink jet printing, screen printing, or known lithographic processes. A dielectric layer 75 is deposited on the top surface and patterned before vias 76 are created through the flexible substrate 60 as shown in FIG. 13. Alternatively, the second substrate may comprise a flexible metal foil and interconnect layers are fabricated on top of the metal foil using dielectric layers providing isolation between the conductors.

Figure 14:
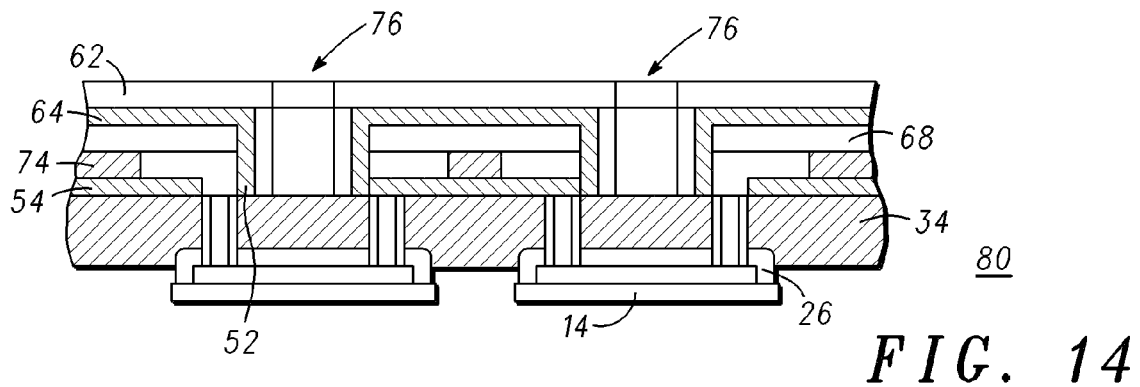

Referring to FIG. 14, after both the rigid (donor) substrate 12 and flexible (host) substrate 60 have been planarized and prepped, the host substrate 60 is aligned to the fuel cell 51, and bonded to form the bonded device 80. The bonding is accomplished using an adhesive wafer bond about one micron thick. Various materials with a low dielectric constant could be used for the adhesive bond, including a bridged poly-arylene ether with a dielectric constant of 2.8 and thermal stability of up to 400° C. (Flare, which is manufactured by Honeywell Advanced Microelectronic Materials). The substrate 12 may be removed from the fuel cell 51 either before (FIG. 9) or after (FIG. 14) the flexible substrate 60 has been bonded thereto. After the substrate 12 is removed, the layer 14 and metal 26 are removed to provide gas access to the cathode regions.

Figure 15:
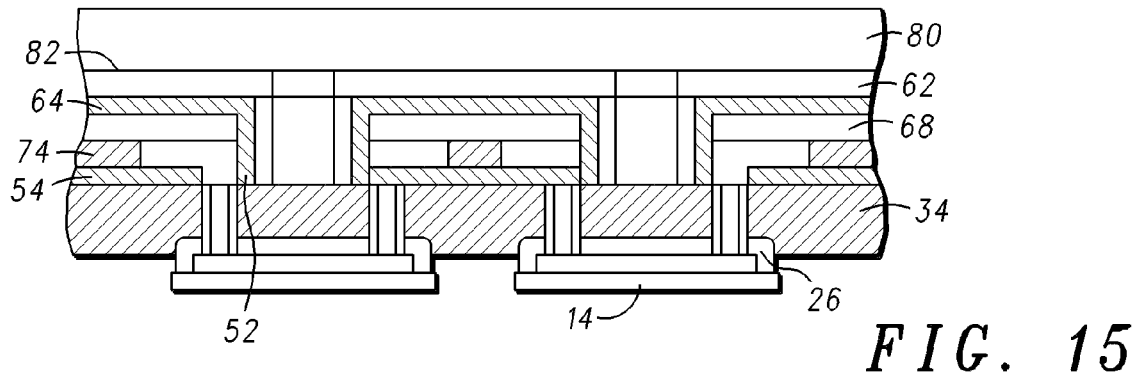

Referring to FIG. 15, an optional porous material 80 may be placed on the surface 82 of the flexible substrate 60 to provide an efficient and low cost method of distributing fuel to the vias 76. By placing the porous material 80 under the micro fuel cell arrays, there is no need to precisely align the individual anodes from the rigid substrate 12 with the gas connections in the flex substrate 60. The porous substrate 80 allows gas feed into all the anodes uniformly and simplifies the manufacturing. Inlet anode gas manifolds 76 are formed to supply the gas to the porous areas from a single anode gas inlet. Electrical interconnects and input/outputs are also formed on the flex substrate making it easier to connect the cells and also interface easily with the conformal power source application. If the second substrate comprises a metal foil, the metal foil itself may be porous, thereby negating the need for the porous material 80.

Figure 9:
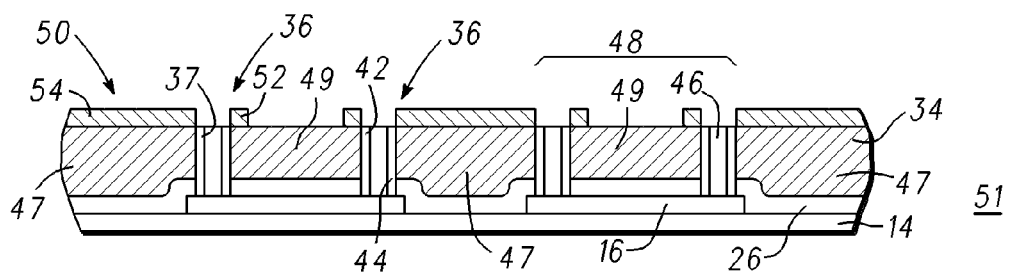
Figure 16:
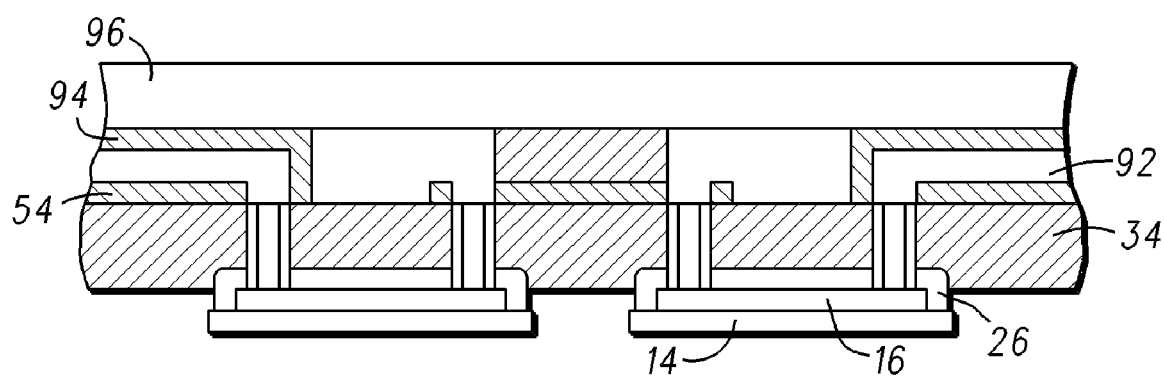
FIG. 16 is a partial cross-sectional view of two fuel cells as fabricated in accordance with a second exemplary embodiment.

Referring to FIG. 16 and in accordance with the second exemplary embodiment, the rigid substrate is fabricated as shown in FIG. 9. A dielectric layer 92 is deposited on the above the metal layer 54, and is patterned to create vias to be filled with metal for anode metal connections, and create opening over the anode area for gas entrance. A metal layer 94 is deposited on the dielectric layer 92 to contact the metal layer 52 through the metal vias. A second substrate 96 comprising a porous material is positioned on the fuel cell to provide gas access to the cathode. The first substrate 12 may remain with the fuel cell until after the second substrate 96 has been affixed to the fuel cell. After the first substrate 12 is removed, the layer 14 and metal 26 are removed to provide gas access to the cathode regions.

The exemplary embodiment disclosed herein provides an integrated micro fuel cell that derives power from a three-dimensional fuel/oxidant interchange having increased surface area and is provided on a second substrate, thereby avoiding precise alignment requirements of the holes providing fuel thereto, thereby creating conformable high performance micro fuel cell power sources to suit the application. The second substrate comprises, for example, one of a flexible material or a porous material.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims.

The invention claimed is:

1. A method for fabricating a fuel cell, comprising:
   forming a plurality of micro fuel cells on a first substrate, the first substrate being rigid, the forming a plurality of micro fuel cells includes:
      forming, on the rigid substrate, a plurality of pedestals including an anode and a cathode each comprising a porous metal;
      positioning an electrolyte between the anode and the cathode; and
      forming first metal contacts on the anode and cathode;
   removing the plurality of micro fuel cells from the rigid substrate;
   providing a second substrate having gas access vias; and
   positioning the plurality of fuel cells on the second substrate.

2. The method of claim 1 wherein the providing step comprises providing a flexible substrate.

3. The method of claim 1 wherein the providing step comprises providing a porous substrate.

4. The method of claim 1 wherein the providing step comprises providing one of a polymer or a metal substrate.

5. The method of claim 1 wherein the removing step comprises using one of an oxide layer polishing process or a selective etch process.

6. The method of claim 1 wherein the providing step comprises providing the second substrate comprising at least two electrical interconnects, a plurality of gas manifolds, and one of a porous area or gas access holes for providing fuel thereto.

7. A method for fabricating a fuel cell, comprising:
   forming a plurality of micro fuel cells on a first substrate, including forming first metal interconnects on a side of each of the plurality of micro fuel cells opposed to the first substrate, the first substrate being rigid;

removing the plurality of micro fuel cells from the rigid substrate;

providing a second substrate having gas access vias;

forming second metal interconnects on a side of the second substrate; and positioning the plurality of fuel cells on the second substrate, the first metal interconnects being in electrical contact with the second metal interconnects.

8. A method for fabricating a fuel cell, comprising:

providing a first substrate comprising a rigid material;

forming a plurality of micro fuel cells on the rigid substrate, comprising:

forming, on the first substrate, a plurality of pedestals, each pedestal including an anode and a cathode comprising a porous metal;

positioning an electrolyte between the anode and the cathode; and forming first metal contacts on the anode and cathode;

providing a second substrate having second metal contacts and gas access holes;

removing the plurality of micro fuel cells from the first substrate; and positioning the second substrate against the plurality of micro fuel cells wherein the first and second metal contacts are selectively positioned to make electrical contact.

9. The method of claim 8 wherein the forming a plurality of pedestals comprises:

patterning a photoresist to define first and second openings;

dispensing beads in both of the first and second openings;

placing a metal around the beads;

removing the beads wherein the metal forms the porous metal;

removing the photoresist to expose sides of the porous metal comprising the anode and cathode; and depositing an electrocatalyst on the sides; and wherein the positioning an electrolyte step comprises placing the electrolyte between the electrocatalyst on the sides.

10. The method of claim 8 wherein the providing the second substrate step comprises providing a flexible substrate.

11. The method of claim 8 wherein the providing the second substrate step comprises providing a porous substrate.

12. The method of claim 8 wherein the providing the second substrate step comprises providing one of a polymer and a metal substrate.

13. The method of claim 8 wherein the removing step comprises using one of an oxide layer polishing process or a selective etch process.

14. The method of claim 8 wherein the forming a plurality of micro fuel cells step comprises forming first metal interconnects on a side opposed to the rigid substrate of each of the micro fuel cells; wherein the providing step comprises forming second metal interconnects on a side of the second substrate; and wherein the positioning step comprises positioning the first metal interconnects in electrical contact with the second metal interconnects.

15. The method of claim 8 wherein the providing the second substrate step comprises providing at least two electrical interconnects, a plurality of gas manifolds, and one of a porous area or gas access holes for providing fuel thereto.

16. A method for fabricating a fuel cell, comprising:

providing a first substrate comprising a rigid material;

forming an insulator layer over the substrate patterned in a plurality of islands;

patterning a photoresist over the plurality of islands as a plurality of cylindrical rings, one of the plurality of cylindrical rings on each of the plurality of islands, each of the plurality of cylindrical rings having a first end positioned on the insulator layer and a second end opposed thereto;

positioning a plurality of beads both within each of the plurality of cylindrical rings and between each of the plurality of cylindrical rings;

placing a metal between each of the plurality of beads;

removing the plurality of beads, wherein the metal forms a porous metal having a surface opposed to the rigid substrate;

removing the photoresist to form a plurality of cavities;

forming an electrocatalyst on the sides of the porous metal within each of the plurality of cavities;

positioning an electrolyte within each of the plurality of cavities, wherein the electrocatalyst is positioned between the electrolyte and the porous metal;

patterning a first metal interconnect on the surface of the porous metal;

providing a second substrate that defines gas access holes;

forming a second metal interconnect on the second substrate; and positioning the second substrate on the surface of the porous metal, wherein the first metal interconnect contacts the second metal interconnect; and removing the first substrate.

17. The method of claim 16 wherein the providing the second substrate step comprises providing a flexible substrate.

18. The method of claim 16 wherein the providing the second substrate step comprises providing a porous substrate.

19. The method of claim 16 wherein the providing the second substrate includes providing one of a flexible polymer and a flexible metal substrate.

20. The method of claim 16 wherein the removing step comprises using one of an oxide layer polishing process or a selective etch process.

21. The method of claim 16 wherein the providing the second substrate step comprises providing a flexible substrate comprising at least two electrical interconnects, a plurality of gas manifolds, and one of a porous area or gas access holes for providing fuel thereto.

* * * * *